United States Patent [19]
Aaro et al.

[11] Patent Number: 4,720,859
[45] Date of Patent: Jan. 19, 1988

[54] METHOD AND SYSTEM FOR THE MUTUAL ENCYPHERED INDENTIFICATION BETWEEN DATA COMMUNICATING STATIONS AND STATIONS FOR USE WITH SUCH METHOD AND SYSTEM

[75] Inventors: Tore I. Aaro, Åkersberg; Torgny O. Rustan, Stockholm; Pär Öman, Kungsängen; Rolf J. Blom, Linköping; Robert Forchheimer, Linköping; Viiveke A. Fak, Linköping; Bror I. Ingemarsson, Linköping, all of Sweden

[73] Assignee: U.S. Philips Corporation, New York, N.Y.

[21] Appl. No.: 365,711

[22] Filed: Apr. 5, 1982

[30] Foreign Application Priority Data

Apr. 8, 1981 [SE] Sweden ............................... 8102268

[51] Int. Cl.$^4$ ............................................. H04L 9/02
[52] U.S. Cl. ........................................ 380/23; 380/25; 380/46
[58] Field of Search .............. 178/22.01, 22.08, 22.09, 178/22.13–22.16; 375/2.1; 380/23, 25, 46

[56] References Cited

U.S. PATENT DOCUMENTS

| 4,186,871 | 2/1980 | Anderson et al. | 178/22.08 |
|---|---|---|---|
| 4,193,131 | 3/1980 | Lennon et al. | 178/22.08 |
| 4,206,315 | 6/1980 | Matyas et al. | 178/22.08 |
| 4,264,782 | 4/1981 | Konheim | 380/25 |
| 4,302,810 | 11/1981 | Bourcius et al. | 178/22.08 |
| 4,326,098 | 4/1982 | Bouricius et al. | 178/22.08 |
| 4,393,269 | 6/1983 | Konheim et al. | 380/25 |
| 4,408,203 | 10/1983 | Campbell | 178/22.08 |
| 4,423,287 | 12/1983 | Zeidler | 178/22.08 |
| 4,471,216 | 9/1984 | Herve | 178/22.08 |
| 4,578,532 | 3/1986 | Markwitz | 380/23 |
| 4,649,233 | 3/1987 | Bass et al. | 380/25 |
| 4,652,698 | 3/1987 | Hale et al. | 380/25 |

FOREIGN PATENT DOCUMENTS

| 0021401 | 7/1981 | European Pat. Off. | 178/22.08 |
|---|---|---|---|
| 2047506 | 11/1980 | United Kingdom | 178/22.08 |

OTHER PUBLICATIONS

NBS Special Publication 500-54 (10/79), Smid Key Notarization System for Computer Networks.
Cryptography–A Primer, Wiley Interscience Pub., N.Y., (1981), Konheim (II), pp. 331–337.

Primary Examiner—Salvatore Cangialosi
Attorney, Agent, or Firm—Jack E. Haken; James J. Cannon, Jr.

[57] ABSTRACT

A method for transmitting ciphered information between two stations while using session keys. According to the method a mutual identification of the stations (AK, A; A,B) is obtained while using an identification device (ID) comprised in each station. Number values ($r_1, r_2$), originating from each station, may be exchanged by said identification in a form which is so ciphered that the number values may be recovered by the counterpart only. The session key ($t_m$) is formed on basis of said number values in a modification device (MODIFI). Ciphered data messages are exchanged between the station using the established session key and a message ciphering/deciphering device (MCRY, MDECRY) comprised in each station. According to the method the mutual identification and the establishment of the session key via an open channel may be obtained by transmitting one separate identification sequence in each direction.

12 Claims, 3 Drawing Figures

Fig. 2

| ST | STATION A | | CH | STATION B | |
|---|---|---|---|---|---|
| | MEM | OPERA | | OPERA | MEM |
| 0 | $d_a, k_b$ | | | | $d_b, k_a$ |
| 1 | $d_a, k_b, r_1$ | gen $r_1$ | | | -"- |
| 2 | -"- | calc $s_1 = E(r_1, k_b)$ | | | -"- |
| 3 | -"- | tr $cg_1 = (a, s_1)$ | $cg_1 \rightarrow$ | | -"- |
| 4 | -"- | | | re $cg_1$ | $d_b, k_a, r_1$ |
| 5 | -"- | | | calc $r_1 = D(s_1, d_b)$ | -"- |
| 6 | -"- | | | calc $s_2 = f(r_1)$ | $d_b, k_a, r_1, r_2$ |
| 7 | -"- | | | gen $r_2$ | -"- |
| 8 | -"- | | | calc $s_3 = E(r_2, k_a)$ | -"- |
| 9 | -"- | re $cg_2$ | $\leftarrow cg_2$ | tr $cg_2 = (b, s_2, s_3)$ | -"- |
| 10 | -"- | calc $f(r_1)$ | | | -"- |
| 11 | -"- | comp $f(r_1) = s_2$ ? | | | -"- |
| | | $f(r_1) \neq s_2 \rightarrow BL$ | | | |
| 12 | $d_a, k_b, r_1, r_2$ | calc $r_2 = D(s_3, d_a)$ | | | -"- |
| 13 | $d_a, k_b, r_1, r_2, t_m$ | calc $t_m = t(r_1, r_2)$ | | | -"- |
| 14 | -"- | calc $s_4 = f(r_2)$ | | | -"- |
| 15 | $d_a, k_b, t_m$ | tr $cg_3 = (a, s_4)$ | $cg_3 \rightarrow$ | re $cg_3$ | $d_b, k_a, t_m$ |
| 16 | -"- | | | calc $f(r_2)$ | -"- |
| 17 | -"- | | | comp $f(r_2) = s_4$ ? | -"- |
| | | | | $f(r_2) \neq s_4 \rightarrow BL$ | |
| 18 | -"- | | | calc $t_m = t(r_1, r_2)$ | -"- |
| 19 | -"- | | | re $T_{M1}$ | -"- |
| 20 | -"- | calc $T_{M1} = T_M(M_1, t_m)$ | | calc $M_1 = \overline{T}_M(T_{M1}, t_m)$ | $d_b, k_a, t_m, M_1$ |
| 21 | -"- | tr $T_{M1}$ | $T_{M1} \rightarrow$ | | -"- |
| 22 | -"- | | | | $d_b, k_a, t_m, M_1$ |

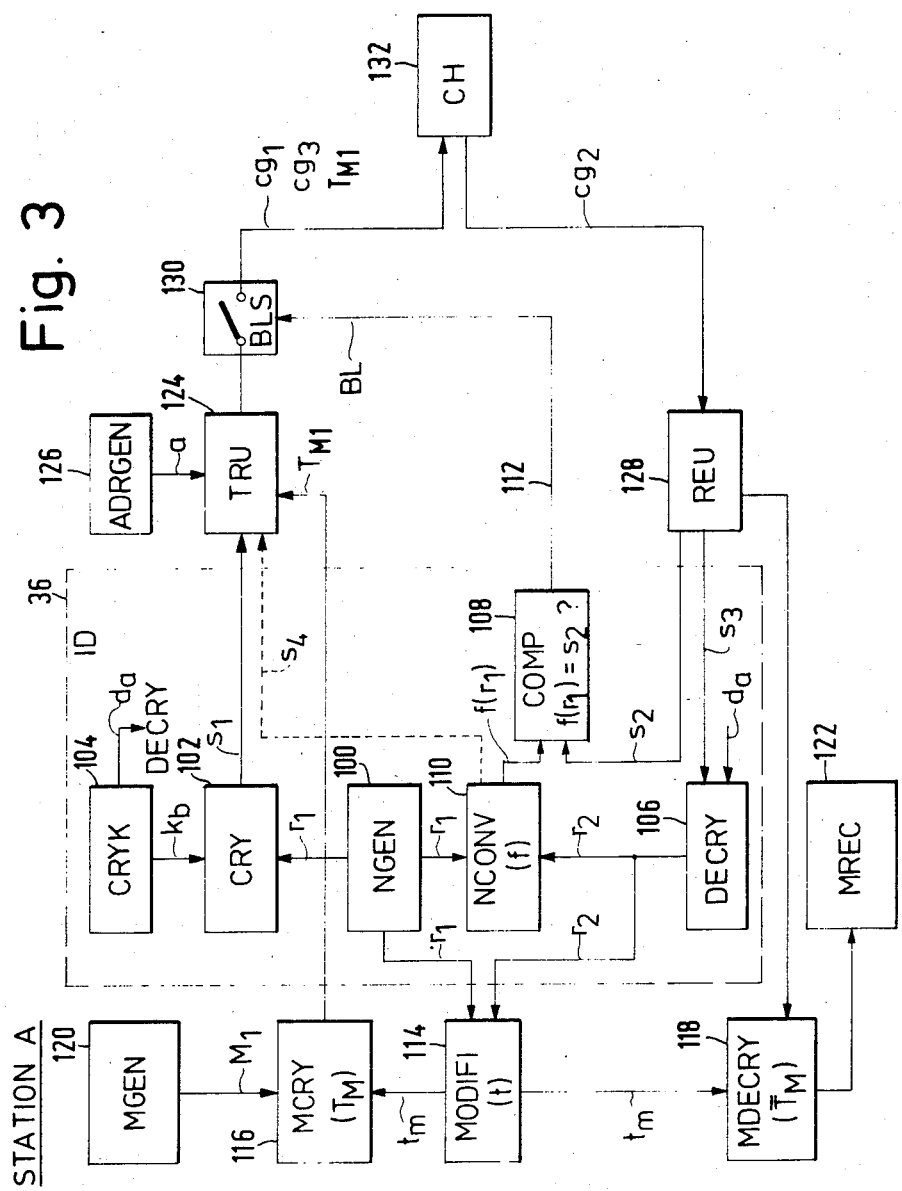

METHOD AND SYSTEM FOR THE MUTUAL ENCYPHERED INDENTIFICATION BETWEEN DATA COMMUNICATING STATIONS AND STATIONS FOR USE WITH SUCH METHOD AND SYSTEM

BACKGROUND OF THE INVENTION

1. Field of the Invention

This invention is directed to a method for the transmission of data messages between two stations A and B, which stations may each belong to a group of equally authorized stations, each message being transmitted after encipherment by using a message ciphering key. The invention is also directed to a transmission system for carrying out the method, and to a station for use in such system.

The invention will be described as applied to a so-called EFT-system (Electronic Fund Transfer system) or a bank terminal system and to problems appearing in such systems. However, the method and devices according to the invention are generally applicable in data transmission systems of various types and intended for various purposes.

2. Description of the Prior Art

A bank terminal system or a system for transmission of data or text comprises a number of terminal stations having data input and data output means. Each terminal station may be connected to a central computer for the exchange of information in both directions. A terminal station may also comprise a so-called cash dispenser apparatus, from which a customer may obtain cash by using a personal data carrier, which is temporarily connected to the system. Security of the system is obtained in that a customer is obliged to identify himself to the system before any transaction is allowed. At a human-operated terminal station this may mean that the customer will have to present an acceptable identification document. At an unsupervised terminal station such as a cash dispenser said identification may comprise the step that the customer supplies a secret personal code, a so-called PIN-code, via a keyboard, the corresponding PIN-code then being accessable in the system for comparison with the code which is supplied. The trend is towards an increased number of unsupervised terminal stations which may offer an increased number of different services. Personal data carriers are today shaped as cards according to an accepted ISO-standard and comprise magnetizable carriers for data storage.

A bank terminal system is subject to security risks of different types, or threats. Said threats may then be directed to information transmitted in the system, or to the hardware comprised in the system, such as transmission lines, terminal stations, or personal data carriers. The threats directed to the actual information mean that it could be possible by active or passive tapping to derive, modify or distort the information content. As counter measures, one the one hand the transmission lines and further system elements in question may be protected physically. In bank terminal systems the usual type of transmission means that a terminal station communicates with the central computer via a public or general data network. To physically protect a network of this type would, if possible at all, demand high costs. As a consequence the practicable solution means enciphering of the information.

Alternatively, unauthorized hardware may appear. Accordingly, a unauthorized cash dispenser apparatus may appear in a bank system. In a so-called POS-system (Point of Sales system) a customer could then pay for goods at a place for purchase by using his personal data carrier in a unauthorized terminal station. A different threat is that unauthorized personal data carriers may appear. For the time being the use of unauthorized data carriers is prevented by the fact that the customer is obliged to supply his secret personal code in order to obtain access to the system. However, this procedure means no protection against a unauthorized terminal.

The problem of unauthorized terminals and unauthorized data carriers may be illustrated by the so-called "wardrobe case". According to this case a customer may meet a unauthorized terminal which to the customer appears as a genuine one. This unauthorized terminal is connected to the so-called "wardrobe" in which is housed equipment for tapping the information signals supplied by the data carrier and the key set of the terminal station, and also equipment for forwarding correctly information between the unauthorized terminal and the central computer of the system. By this tapping the entered, secret, personal code is obtained and further information from the data carrier. Said information may then be used for the provision of a unauthorized data carrier.

Thus the transmission of unprotected information on physically accessible lines would mean a grave risk. Furthermore, this case also illustrates necessity for both identification of the user and his data carrier as being authorized in the system to the terminal but also for identification of the terminal to the user and being a genuine one. This mutual identification may be obtained by giving the personal data carrier of the user the shape of an active card, on which the identification information supplied by the terminal may be evaluated. The card will comprise semiconductor memory and signal processing capability, and will function as a station communicating with a terminal.

By a mutual identification of active stations and ciphering of information which is transmitted many threats may be eliminated. The obtained security will depend on the choice of identification procedure and ciphering method. Ciphering of a traditional type means that authorized stations of a system have access to a ciphering algorithm and a deciphering algorithm and also a ciphering key operating as a parameter in said algorithms. If an unciphered or clear-text message is designated by x, the ciphered version thereof or "cipher" is designated by y, the ciphering key is designated as k, the ciphering algorithm is designated E and the deciphering algorithm is designated D, this may be expressed according to the following $$y = E(x,k) \text{ and } x = D(y,k)$$

in which expression D is the inverse function of E for all possible values of k. In a ciphering system of this type it is not necessary to keep the algorithms secret while the key k shall be known to authorized stations only. The ciphering security depends on the difficulty to find the key k. Accordingly, with a knowledge about x and y it should be difficult to find the value of k for which holds $y = E(x,k)$. In the art this is expressed as that the finding of k should be "computationally unpracticable", which means imposing practically unacceptable requirement on data processing capacity and/or time of operation. The weak points of a ciphering method of this type is the fact that the one same ciphering key must be distributed to all authorized stations and from that time be kept secret. In a larger organization the distribution of keys appears a great problem. If transmission between the stations is effected via an unprotected channel, and no additional measures are taken, no key may be transmitted along this channel. This problem has led to systems in which the key or part thereof is distributed in a modified form to authorized stations in order to be restored at a respective station by the use of secret information. Accordingly, also in this case a system is obtained using information which is common to the stations, and this endangers the data security.

The problem of enciphering key distribution is made even worse if the aim is a frequent change of ciphering keys. The desirable situation is to use a fresh enciphering key for every single case of transmission. Such a key is named a "session key". Dependent on the actual application of use a "session" may comprise the transmission of a given amount of data at one single occasion or different amounts of data at different occasions within a defined time space, for example one day.

European patent application No. 0002580 describes a method for verification of the cipherment keys used at two cooperating stations. To this end a random number is sent in a ciphered form from one station to the other, which station operates on the ciphered number using its own key. The result which is obtained is sent back to said one station at which it is checked against the ciphered number which was sent from the beginning. If the check doesn't fail it is thereby verified that both stations have identical ciphering keys. No mutual identification of the participating stations is obtained according to this method and furthermore the stations make use of identical, secret key information.

U.S. Pat. No. 4,227,253 describes a system operating with several "levels" of keys. According to the specification a session key may be established between a host system in one domain and a host system in another domain for performing cryptographic operations between the same. To this end a specific, mutually agreed upon, common cross-domain key is used, whereby each different host system may avoid revealing to other systems its own master key. Disregarding the fact that a complicated arrangement of different keys for different purposes is used it is also evident that the participating host systems have common, secret key information.

The prior art systems described above all have the drawback that all operating parties make use of common key information which must be kept secret by each party, which means that if said key information is revealed by one party this will damage the overall system. A further disadvantage is that no real "hand-shaking" operation is performed between operating parties in order to safeguard that all of the communicating parties are authorized.

SUMMARY OF THE INVENTION

The object of the invention is to obtain a method for data transmission that shall make possible a mutual identification of active stations and ciphering of information by the use of ciphering keys which have been established via the transmission channel by exchanging as few transmission sequences as possible and in which method the use of information which is common to all operating stations and must be kept secret by each station, may be completely avoided.

The object of the invention is obtained by a method which is characterized in that before transmission of data messages stations A and B identify each other by a mutual exchange of respective identification sequences, which uniquely identifies A against B and vice versa, and that said message ciphering key is established independently at the respective stations on basis of the identification sequences which have been exchanged, and which may be operated upon by using a modification function.

According to one preferred embodiment said identification sequences are exchanged as respective ciphers obtained from an identification ciphering function, and that said message ciphering key, when established, is used in a message ciphering function for the ciphering of data messages to be transmitted, which is different from the identification ciphering function.

A further preferred embodiment is characterized in that each identification sequence has the form of ciphered number value, being preferably a pseudo-random number; that station A transmits a ciphered first number value which may be deciphered by station B only; that station B deciphers and transmits back to station A said first number value in a form which may be deciphered and evaluated by station A only, that station B transmits to station A a ciphered second number value which may be deciphered by station A only; and that station A deciphers and transmits back to station B said second number value in a form which may be deciphered and evaluated by station B only, while said first and second number values which are received and deciphered at the respective stations may be converted by means of a transformation function, which is known by the stations, before the same are ciphered again and transmitted back to the respective counterparts.

According to a further preferred embodiment station A transmits to station B a first cipher comprising said first number value, that station B transmits back to station A a second cipher comprising said second number value and the deciphered first number value, and that station A transmits back to station B a third cipher comprising the ciphered second number value, while said third cipher may be accompanied by a data message which is ciphered by means of said message ciphering function and said message ciphering key.

By the above mentioned embodiments of the method according to the invention the following advantages are obtained:

- a message enciphering key having the character of a session key is established via an unprotected or open channel,
- by means of the identification sequences which are exchanged and which may have the form of ciphered first and second pseudo-random numbers which may be deciphered and transmitted back by the receiving counterpart only, a mutual identification or "handshaking" is obtained.
- the number of necessary transmission sequences for establishing a channel for ciphered transmission between two stations is minimized by using the necessary identification sequences themselves as a basis for key establishment.
- different ciphering functions may be used for identification/key establishment and data message transmission, and thereby the security and effectiveness of a transmission session may be improved by selecting a more elaborate and computationally demanding function for the identification/key establishment and a less demanding and faster function for the data message transmission.

The expression "cipher" as used above is meant to cover also a transmission sequence the information contents of which has been protected by encipherment and/or otherwise in a way such that decipherment or evaluation may be carried out by an authorized receiver only. Further the mutual identification of the parties may also be obtained by having the parties exchange a known message, which is then enciphered by using the established message enciphering key. If this enciphered message is not received correctly, this means that the message enciphering key has not been established correctly and consequently the transmitting station is not authorized.

When using the method according to the invention in a data transmission system a threat may appear in the form a so-called "twin station". A "twin station" to station A is an unauthorized station having access to the secret information of station A and which may accordingly in parallel with the true station A receive and decipher and/or evaluate the information which has to do with the station. Different from the "wardrobe case" mentioned above such a twin station is unknown to the true station. The problem of a passively tapping "twin" may be eliminated by converting the second number value in station A by a transformation function when it is transmitted back to station B; by having first number value converted in station B by said transformation function when transmitted back to station A, while identification is obtained in that each station converts its own number value by the transformation function and internally compares this converted number value with the converted number value which is received.

A "twin station" may also appear actively and replace the true station. Such a threat may be rejected by "looking back" on earlier transactions of the station before any new transmission, which for example may comprise the step of giving a running number to each transaction and sensing of the running number.

The number of introductory transmission sequences may be as low as possible by including a data message in the third cipher, thereby requiring one transmission only from each station in order to obtain a mutual identification and key establishment.

According to another preferred embodiment said first and second ciphers are formed and deciphered by the use of an identification ciphering function and its inverse and different keys for ciphering and deciphering, a public encipherment key being allotted to each station as well as a deciphering key associated therewith and being kept secret in a station, each station having from the beginning a knowledge about its own secret deciphering key, the public ciphering key of the counterpart and said ciphering function and its inverse. According to this embodiment a drastic decrease of the common secret information in the system is achieved.

The common secret information may be completely eliminated if the transformation function is of the type one-way function. Thereby is obtained that each station must keep secret its own deciphering key only, while on the contrary said ciphering function, said message ciphering function, said transformation function, said modification function and as already mentioned said ciphering keys all may be publicly known.

Expressed differently, a consequence of the method according to the invention is that a mutual identification of the stations is obtained by the use of a first and a second number value generated in station A and station B, respectively. The process of identification has the outcome that each of said stations knows about both said number values. Thereafter, the number values are put together or modified accordingly at both stations so that a message ciphering key (session key) which is common and which is unique for the occasion of transmission obtained. By using said session key and a message enciphering function which is known to both said stations messages may thereafter be transmitted between the stations.

A transmission system for carrying out the method is characterized in that each station of the system is provided with an identification device for a mutual identification of a cooperating station while using an identification ciphering function and its inverse and a pair of keys which is allotted to the station and comprising a public ciphering key and a deciphering key which is kept secret in the station, said identification device comprising a number generator for generating a number value as an identification sequence, a ciphering device for ciphering said number value while using said ciphering function and the public ciphering key of the counterpart, a deciphering device for detecting a number value received from the counterpart while using the inverse of said ciphering function and the secret deciphering key of the station; a modification device for generating a message ciphering key based on the number values which have been exchanged; and a message ciphering/deciphering device for ciphering and deciphering data messages while using the message ciphering key which is generated.

The invention furthermore relates to a station for use in the method or system described herebefore.

BRIEF DESCRIPTION OF THE FIGURES

The invention will be described with reference to the drawings, in which:

FIG. 2 shows a diagram comprising a sequence of operational steps performed at two cooperating stations up to the transmission of a first data message;

FIG. 3 shows a more detailed functional block diagram of the station A when performing the operational steps according to FIG. 2.

DESCRIPTION OF A PREFERRED EMBODIMENT

Figure 1:
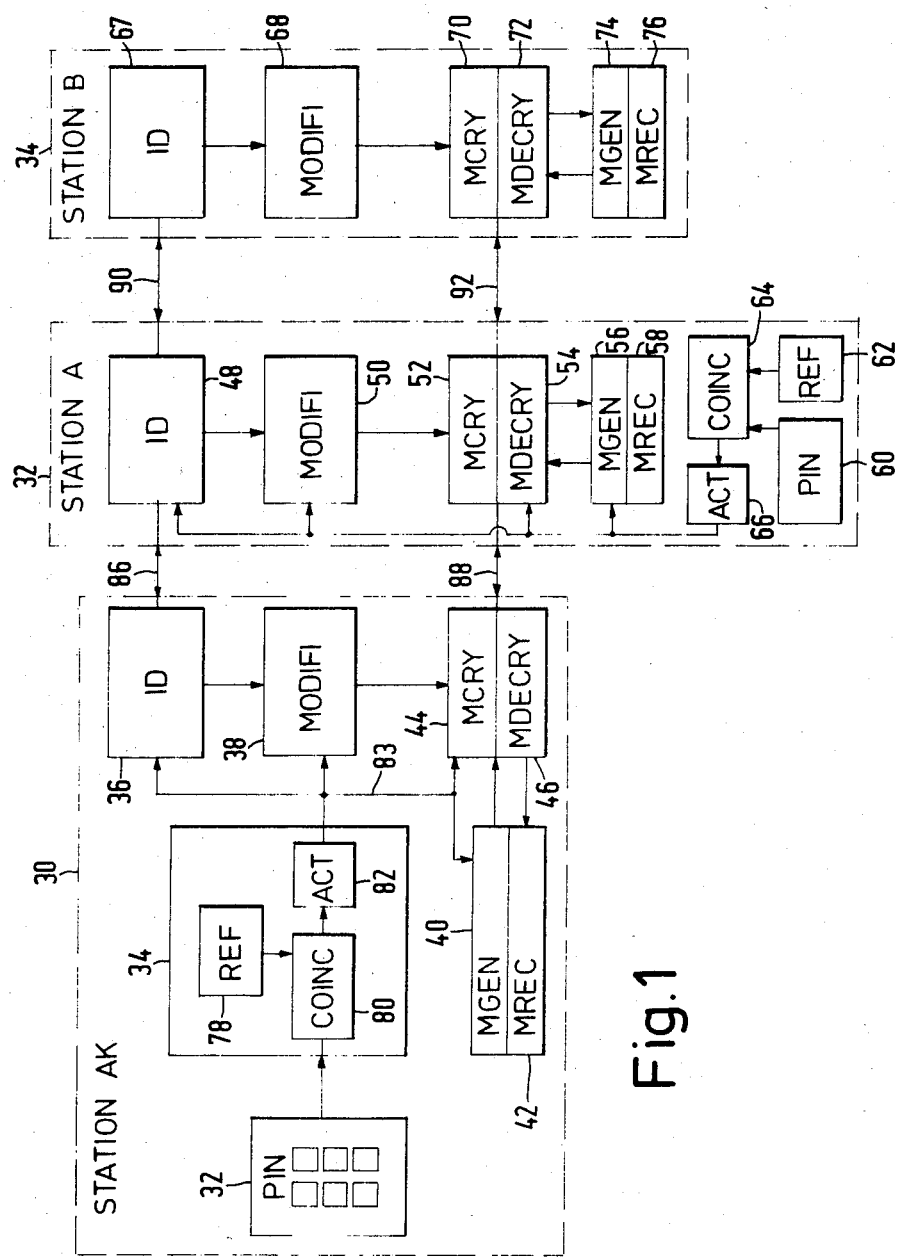
FIG. 1 shows a simplified block diagram disclosing three cooperating stations AK, A, B.

FIG. 1 shows a simplified block diagram having three cooperating stations AK (30), A (32) and B (34). Stations AK, A have identical elements, some thereof have no counterpart in station B. Normally communication takes place between only two stations at any instant. Station AK represents a personal data carrier shaped as an active card. Station AK comprises an identification device ID (36) for identification towards a station communicating with station AK, for example, towards station A. Furthermore station AK comprises a modification device modifi (38) which receives number values that are exchanged during the process of mutual identification for by modification thereof generating a message ciphering key. The message ciphering key is used thereafter for ciphering and deciphering data in a combined ciphering/deciphering device MCRY/MDECRY (44/46). The data to be transmitted from station AK are produced by a message generator MGEN (40)

and messages received are sent to a message receiver MREC (42).

The station AK also comprises a key set PIN (32) for entering into the card a personal secret code of the owner, that is a so-called PIN code. The supplied personal code is transmitted to an evaluation device (34) comprising a comparator circuit COINC 80 and a reference code memory REF 78. In memory REF the corresponding correct personal code is stored, which code is supplied to said comparator circuit. When equality is detected between the personal code which is entered and the one which is stored, the comparator circuit generates a signal which is supplied to an activating means ACT 82 which will then activate temporarily the further functions on the active card by means of a control signal on line 83. Only during this temporary activation the card AK and the cooperating station A (32) may execute mutual identification and exchange data messages. Advantageously, the activating means ACT may be so dimensioned that the card will be inactivated automatically when the transmission is finished, for example after a predetermined time interval or by means of a reset mechanism triggered by an "end of message" signal. Before the next-following data exchange station AK must be activated again by a renewed supply of said PIN code. In this way an increased safety against unauthorized use of station AK is realized.

FIG. 1 also shows two stations A and B, which for example may have a form of a bank terminal device or a POS device. Like station AK each of the stations A and B, respectively, comprises an identification device ID, 48, 66 a modification device MODIFI 50, 68, a message enciphering/deciphering device MCRY, MDECRY 52/54, 70/72 and a message generator/receiver MGEN, MREC 56/58, 74/76. Like station AK the stations A and B may comprise said means for a PIN controlled activation, that is the means PIN, REF, COINC, ACT (60–66) as shown in station A. In certain cases the latter sub-system may be omitted as has been shown for station B.

The stations may be interconnected via a transmission channel which in FIG. 1 is represented by double arrows 86–92 between the identification and message enciphering/deciphering devices thereof. The transmission channel may comprise a galvanic coupling or a radio connection and may comprise a channel of a time divisional multiplex system or a frequency divisional multiplex system. In the case of bank terminals the transmission channel may comprise a part of the general data network. For example lines 86, 88 may be embodied in a single lead or time/frequency slot. It is stressed that a communication may be set up via one or more further stations, which then merely relay the information unchanged. Thus a communication session could be executed directly between stations AK and B, station A then merely relaying the messages.

The diagram of FIG. 2 shows the introductory operational steps for a transmission between the station A and the station B via the transmission channel CH. The diagram comprises a column ST in which the operational steps are numbered sequentially. The numbering of the operational steps has been done without considering the fact that some of the steps may be carried out simultaneously in the respective stations. As a consequence the number of steps may be lower in the time space. Furthermore the diagram comprises for each station a column MEM, in which is indicated what is stored in the station at each step, and a column OPERA indicating the operations carried out by the station. In the column CH the transmission sequences on the transmission channel are shown. Furthermore, reference is already had to the more detailed block diagram of a station shown in FIG. 3.

This embodiment of the identification process uses an identification enciphering function E and its inverse D, operating with double keys, i.e. each station has an enciphering key and a deciphering key associated therewith. The ciphering key is public, i.e. it is available (known) to all stations in the system, but the deciphering key of the station is kept secret in the station.

The relation between the ciphering key $k_a$ and the associated deciphering key $d_a$ is unique and may be expressed by means of a function F as follows $$k_a = F(d_a)$$

The security of a ciphering system using a public key depends on the difficulty of finding out the secret key when knowing the public key. Expressed by means of the function F this means that it should be "computationally unpracticable", according to the definition given above, to calculate $$d_a = F^{-1}(k_a)$$

from which follows that the function F shall be a so-called one-way function.

The ciphering function which is used in combination with a pair of keys k, d is a so-called "trap door function". A trap door function has the character of a one-way function to anybody not having available the complete information, i.e. both of said keys k and d and said function and its inverse.

One example of a trap door function is $C = M^k \bmod n$ (1), in which C designates the cipher of the message M, k designates the public ciphering key, n is an integer and (mod n) designates a function which is the remainder after a repeated devision by n.

The trap door character of the function means that deciphering may be obtained only with a knowledge about the associated secret deciphering key d by means of the function $M = C^d \bmod$ (2).

In this trap door function the following relation is valid between the keys k and d $$k \cdot d = (1) \cdot \bmod \phi(n) \tag{3}$$

in which $\phi(n)$ designates the Euler $\phi$-function.

Said ciphering and deciphering function E and D, respectively, may be according to expressions (1) and (2) above. If so, the key pairs which are used fulfill the relation (3).

In the diagram of FIG. 2 the following designations are also used:

$k_a$ = public ciphering key of station A
$d_a$ = secret deciphering key of station A
$k_b$ = public ciphering key of station B
$d_b$ = secret deciphering key of station B
$r_1$ = number value generated by station A
$r_2$ = number value generated by station B
f = transformation function of the one way function type according to the definition given above
t = modification function, having for example the meaning of an addition $t_m$ = the message ciphering key (session key) established for the transmission
$T_M$ = message enciphering function
$\overline{T}_M$ = message deciphering function
$M_1$ = data message
$T_{M1}$ = outcome of $M_1$ from $T_M$
gen = generate
calc = calculate
tr = transmit
re = receive
comp = compare
$cg_1$, $cg_2$, $cg_3$ = ciphers 1, 2, 3
BL = blocking signal In addition to what is shown in columns MEM, each station knows from the beginning the publicity known functions E, D, f, t, $T_M$, and $\overline{T}_M$. The function f may be realized by the same trap door function as said ciphering function E, which is obtained by selecting one of the keys of a pair of keys as a constant key and by ignoring the other one.

The message ciphering function $T_M$ and the inverse thereof $\overline{T}HD$ M, used together with the established so-called session key $t_m$, is of the type which operates with one key which is known to both transmitter and receiver. Several ciphering functions of this type are known. An adequate choice is the so-called DES function or algorithm, in which DES stands for "The United States Data Encryption Algorithm". For a detailed description of this algorithm is referred to Federal Information Processing Standards Publication 46 (Jan. 15, 1977) by United States Dept. of Commerce/National Bureau of Standards.

From the diagram in FIG. 2 is evident that each station from start, step O, has in storage its own secret deciphering key and the public ciphering key of the other station. The mutual identification begins with station A generating and storing a number $r_1$, preferably a pseudo-random number. During step 2, $r_1$ is ciphered by means of $k_b$ to produce $s_1$. A first cipher $cg_1$ is formed from $s_1$ and the address a of the station A and is transmitted in step 3 to station B.

Station B receives $cg_1$ and in step 4 calculates $r_1$ by deciphering $s_1$ while using $d_b$; $r_1$ is stored. In step 5 the result of the transformation function f from the received number value $r_1$ is calculated, which gives $s_2$. Step number 6 means generation of a second number value $r_2$, being preferably a second pseudo-random number, which is also stored. The next step (7) means that $r_2$ is ciphered by using the key $k_a$, which gives $s_3$. During the following step 8 a second cipher $cg_2$ is transmitted to station A comprising $s_2$, $s_3$, b.

The station A receives $cg_2$. This is followed (9) by a calculation of the result of the transformation function from its own number value $r_1$, which result, in the next step (10), is compared with the corresponding result of station B, that is $s_2$, which was received in the second cipher. In case of disagreement, the blocking signal BL is generated during step number 11, said signal blocking or breaking the connection between the stations. In case of agreement, the number value $r_2$ is calculated (12) by deciphering $s_3$ received in the second cipher. At the same time the calculated $r_2$ is stored.

As evident from the columns MEM at this stage, (step number 12), both of the stations know both $r_1$ and $r_2$. During the next following step 13, the station A calculates the session key $t_m$ from $r_1$, $r_2$. At the same time $t_m$ is stored. Thereafter the outcome of the transformation function f from the detected $r_2$ is calculated, which gives $s_4$, which is transmitted in a third cipher $cg_3$ to station B.

The station B receives $cg_3$ and calculates during the following step (16), the outcome of the transformation function f from its own number value $r_2$, which outcome is thereafter compared with the corresponding outcome of station A, that is $s_4$, which was received in said third cipher. In case of disagreement, the blocking signal BL is generated during step number 18, which signal blocks or breaks the connection with station A. In case of agreement, the session key $t_m$ is calculated and stored (19).

The mutual identification has now been obtained and if the connection is maintained both parties have available the established session key $t_m$, which means that the text or data message transmission may begin. Therefore the station A ciphers (20) a first message $M_1$ while using $t_m$, which gives the result $T_{M1}$, which, during the next following step 21, is transmitted to the station B and received thereby. In the station B, $T_{M1}$ is deciphered while using $t_m$, which gives the result $M_1$ (22). In similar way, further messages may be sent in one or in both directions, until the intended packet of data has been transmitted, whereafter the communication is terminated by an end-of-communication signal. In FIG. 2 the use of the PIN code has not been considered explicitly because this represents an earlier stage in time.

Because the station A has available $t_m$ already at step number 13 the first ciphered message $T_{M1}$ may be transmitted together with the third cipher $cg_3$. Consequently, only one separate transmission sequence in each direction is required in order to carry out the identification and the establishment of a session key.

FIG. 3 shows a more detailed functional block diagram of the station A. The cooperation between the blocks is illustrated by the signals which are generated in the station A according to the diagram of FIG. 2. Accordingly, the time of appearance of said signals may be obtained from the diagram. FIG. 3 is intended to illustrate cooperating functional blocks, which may also be realized by providing a computer or microcomputer with the necessary software. Consequently respective different blocks in FIG. 3 may be realized by means of the same hardware, and FIG. 3 cannot be considered a one-to-one picture of a device. In consequence the required data paths, control decoders, timing means and the like have not been shown for brevity.

The identification device ID 36 is indicated by a dotted line. ID comprises a number generator NGEN 100 for generating the number value $r_1$ of the station. The number generator comprises a pseudo-random generator built as a feedback coupled shift register. The number value $r_1$ is supplied to a ciphering device CRY (102) comprising the means for ciphering $r_1$ by means of said trap door function using the public ciphering key $k_b$ of the counterpart, which is obtained from a key memory CRYK (104).

The device ID furthermore comprises a deciphering device DECRY (106), comprising the means for realizing the inverse of said trap door function. In this deciphering device the number value $r_2$ of the other station is calculated while using the secret deciphering key $d_a$ of the station, which is obtained from the key memory CRYK (104). The device furthermore comprises a comparator COMP 108. To the comparator a converted version $f(r_1)$ or $r_1$ is supplied from a number converter NCONV (110), the latter converting the number values which are supplied thereto according to the one way function f. As a second input signal the comparator COMP receives the information $s_2$, that is the information $r_1$ as converted by the other station. The comparator also has means for generating the blocking signal BL on output 112 when inequality is detected.

The number values $r_1$ and $r_2$ are supplied to a modification device MODIFI 114 comprising the means for forming, from said number values, a session key $t_m$ according to a fixed modification algorithm t, which may have the meaning of a simple addition, bit-wise EXCLUSIVE ORING, concatenation or a different combination of the number values. The formed session key $t_m$ is supplied on the one hand to a message ciphering device MCRY (116) and on the other hand to a message deciphering device MDECRY (118) comprising the means for the realisation of said message ciphering algorithm $T_M$ and said message deciphering algorithm $\overline{T}_M$, respectively. These may comprise for example standardized circuits for the realization of the DES algorithm mentioned above. To the message ciphering device 116 are supplied data messages to be transmitted in the ciphered form to station B, from a message generator MGEN (120). Correspondingly, the output of message deciphering device is connected to a memory MREC (122) for the data messages which are received.

The station A also comprises a transmission unit TRU (124) comprising the means for formatting the transmission sequences which are transmitted by the station. To said transmission unit is connected an address generator ADRGEN (126) for generating the station address a. Accordingly, the transmission unit will for example put together the cipher $cg_1$ from the signal a received from address generator 126 and s1 received from cyphering device 102. In correspondence there is comprised a reception unit REU 128 having the means for directing the signals of the received signal sequences to the relevant functional blocks. Accordingly, in the received cipher $cg_2$ the signal $s_2$ is directed to the comparator COMP (108) and the signal $s_3$ is directed to the deciphering device DECRY (106), and further messages are forwarded to the message deciphering device 118. Likewise the transmission unit 124 is also connected to message encyphering unit 116 for therefrom receiving further messages $T_{M1}$ to be sent to the other station. Finally, a dotted line has been shown from number converter 110 to transmission unit 124 to communicate the information s4, calculated according to step 14 in FIG. 2.

As mentioned already the comparator COMP generates a blocking signal BL at non-coincidence, i.e. in case the station B has not been able to identify itself to the station A by transmitting back a correctly converted $r_1$. The blocking signal is used for the control of a blocking device BLS 130, which is illustrated as a switch. The appearance of signal BL breaks the connection between the transmission unit TRU and the channel CH 132 and thereby also the connection between the stations. The channel is bidirectionally operative, while the separation between data-out and data-in is executed in elements 124, 128.

What is claimed is:
1. A method for transmitting data messages between a first station (A, 32) belonging to a first class of stations and a second station (B, 34) belonging to a second class of stations, said method comprising the steps of:
 a. generating a first identification sequence (cg1) is said first station to be sent to said second station from a first identification number value (a, r1) and a first ciphering key (kb) by means of a first identification ciphering function (E);
 b. reproducing said first identification number value in said second station from said first identification sequence by means of a first deciphering key (db) and a second identification ciphering function (D) inverse to said first ciphering function;
 c. generating a second identification sequence (cg2) in said second station to be sent to said first station from said reproduced first identification number value, from a second identification number value (b, r2) and a second ciphering key (ka) by means of said first identification ciphering function;
 d. reproducing said second identification number value in said first station from said second identification sequence by means of a second deciphering key (da) and said second identification ciphering function;
 e. generating a third identification sequence (cg3) in said first station to be sent to said second station from said reproduced second identification number value, by means of a third identification ciphering function (f);
 f. in an identifying step by means of comparison of a part of a received identification sequence (cg2, cg3) to a locally generated identification number value (r1, r2) after being operated by said third identification ciphering function: identifying in said first station said second station as belonging to said second class, and identifying in said second station said first station as belonging to said first class;
 g. generating identical message ciphering keys (tm) upon said mutual identification in both said first and second stations based on the respective first and second identification number values for use in a message ciphering function which is different from any identification ciphering function; and
 h. generating an encyphered message in at least one of said stations by means of said message ciphering key for transmission to the other station.

2. A method as claimed in claim 1, wherein said first and second identification number values contain first and second random numbers.

3. A method as claimed in claim 1, wherein said first ciphering key and second ciphering key are public keys and said second deciphering key and first deciphering key are stored in an initializing step with the first ciphering key and second ciphering key, respectively in said first and second stations.

4. A method as claimed in claim 1, wherein said third identification ciphering function is a one-way function, such that an identification number value may not be recovered even with knowledge of the third identification ciphering function and the identification number value after said number value is operated on by said third identification ciphering function.

5. A method as claimed in claim 1, wherein each station is provided with break means for breaking a connection under control of a noncorrespondence detected in an identifying step.

6. A method as claimed in claim 1, wherein:
one station is a personal data carrier built as an active card, and at least one station includes means for supplying and evaluating a personal code; and
wherein said first step includes initiating the transmission of said identification sequences by an evaluation of a personal code, which evaluation is carried out and accepted internally in one of said stations.

7. A system for transmitting data messages between a first station (A, 32) belonging to a first class of stations and a second station (B, 34) belonging to a second class of stations, comprising:

a. means to generate a first identification sequence (cg1) in said first station to be sent to said second station from a first identification number value (b, r1) and a first ciphering key (kb) by means of a first identification ciphering function (E);

b. means to reproduce said first identification number value in said second station from said first identification sequence by means of a first deciphering key (db) and a second identification ciphering function (D) inverse to said first ciphering function;

c. means to generate a second identification sequency (cg2) in said second station to be sent to said first station from said reproduced first identification number value, from a second identification number value (b, r2) and a second ciphering key (ka) by means of said first identification ciphering function;

d. means to reproduce said second identification number value in said first station from said second identification sequence by means of a second deciphering key (da) and said second identification ciphering function;

e. means to identify said second station as belonging to said second class in said first station and means to identify said first station as belonging to said first class in said second station;

f. means to generate identical message ciphering keys (tm) based on the respective first and second identification number values for use in a message ciphering function which is different from any identification ciphering function upon said mutual identification in both said first and second stations;

g. means to generate an enciphered message by means of said message ciphering key for transmission to the other station in at least one of said stations.

8. A system as claimed in claim 7, characterized in that said identification means comprises a number converter for converting said number values while using a transformation function and a comparator for comparing the number value of a first station in the form which is converted internally with the form as converted by a second station and to generate a blocking signal when an agreement fails to appear.

9. A system as claimed in claim 7 or 8, characterized in that each station furthermore comprises a blocking device for blocking the transmission channel used by said first and second stations whose transmission resulted in said blocking signal.

10. A system as claimed in claim 7 or 8, in which:
at least one station is a personal data carrier built as an active card;
at least one station comprises:
means for supplying and evaluating a personal code
means for activating temporarily said station or said data carrier; and
means to initiate the exchange of said number values dependent on an evaluation which is carried out and accepted internally in the station.

11. A system according to claim 7, characterized in that each station comprises identification means (36), modifying means (38) ciphering and deciphering means (44/46), and message generating and receiving means (40/42).

12. A system as claimed in claim 11, characterized in that at least one station is provided with key means (32) for entering a personal identification code for comparison (80) with an internally generated code (78).

* * * * *